United States Patent [19]

Hashimoto et al.

[11] 4,416,953
[45] Nov. 22, 1983

[54] SECONDARY BATTERY

[75] Inventors: Takafumi Hashimoto, Asahimachi; Yukio Kobari, Tokyo, both of Japan

[73] Assignee: Meidensha Electric Mfg. Co., Ltd., Tokyo, Japan

[21] Appl. No.: 361,818

[22] Filed: Mar. 25, 1982

[51] Int. Cl.³ .............................................. H01M 8/24
[52] U.S. Cl. ...................................... 429/18; 429/70; 429/72
[58] Field of Search .................. 429/18, 72, 80, 81, 429/70; 204/1 R, 269

[56] References Cited

U.S. PATENT DOCUMENTS

| | | | |
|---|---|---|---|
| 4,136,232 | 1/1979 | Durand | 429/18 X |
| 4,197,169 | 4/1980 | Zahn et al. | 204/1 |
| 4,277,317 | 7/1981 | Grimes et al. | 429/18 X |
| 4,279,732 | 7/1981 | Bellows et al. | 429/18 X |
| 4,286,027 | 8/1981 | Shropshire et al. | 429/72 X |
| 4,312,735 | 1/1982 | Grimes et al. | 429/18 X |

Primary Examiner—Charles F. LeFevour
Attorney, Agent, or Firm—Fleit, Jacobson, Cohn & Price

[57] ABSTRACT

The invention relates to an electrolyte circulation type cell stack secondary battery in which the negatively active materials is a metal selected from the group consisting of cadmium, zinc and lead. An electrode is positioned in the vicinity of each of the catholyte inlet and outlet channels of each secondary cell and the electrodes are connected to the cathode of the cell by a connector, thereby maintaining the electrodes at the same potential as the cathode and preventing the occurrence of abnormal electrodeposition.

2 Claims, 3 Drawing Figures

SECONDARY BATTERY

BACKGROUND OF THE INVENTION

The present invention relates to electrolyte circulation type of a cell stack secondary battery of the type in which the negatively active material is cadmium, zinc, lead or the like, and more particularly the invention relates to such secondary battery designed to prevent the occurrence of any abnormal electrodeposition due to small shunt current.

DESCRIPTION OF THE PRIOR ART

Known cell stack secondary batteries of the above type generally comprise a plurality of secondary cells connected in series electrically and each of the electrolytes is supplied into the cathode chamber or the anode chamber of each secondary cell through a catholyte inlet-side common manifold or a anolyte inlet-side common manifold and the catholyte inlet channel or the anolyte inlet channel of each cell and exited through the catholyte outlet channel or the anolyte outlet channel of each secondary cell and a catholyte outlet-side common manifold or a anolyte outlet-side common manifold. While the secondary cells are connected in series in this way, the circulation of the electrolytes is effected in a so-called parallel connection so that a small shunt current is caused at the inlet and outlet sides of each cell via the common manifolds by the potential difference between the plurality of the cell stack anode and cathode and this gives rise to the following undesirable phenomena.

(1) Shunt current loss: The loss of heat is caused by the small shunt current through the manifolds and the channels.

(2) Unequality of quantity of charged electricity: Due to the difference in the current value (mA) of the small shunt current flowing into and out of the channels of the respective cells, the currents flowing in the electrodes of the respective cells differ in value from one cell to another with the result that the amount of electro-deposition of the negatively active metal on the cathode surface and/or the quantity of charged electricity differs from one cell to another and becomes unequal to one another.

(3) Occurrence of abnormal electrodeposition: At the end of each cathode of the lower potential side respectively, into which a small current flows even a slight shunt current causes abnormal electrodeposition due to the end concentration of the cathode thus disturbing the circulation of the electrolyte on the cathode surface and/or causing a short-circuit between the adjacent cathodes.

To overcome these detrimental effects, various methods have heretofore been proposed.

For instance, a method is known in the art in which the manifolds and the channels are decreased in a diameter and increased in length thus increasing the electric resistance of the electrolytes in the manifolds and the channels and thereby decreasing the value of the shunt currents. While this method has the effect of decreasing the shunt current value and reducing some of the previously mentioned difficulties due to the shunt current, i.e., the shunt current loss and the unequality of quantity of charged electricity, even if the shunt current value is decreased, the shunt current flows in the same direction during the charging period as well as the discharging period with the result that abnormal electrodeposition is caused as the cycle of charge and discharge is repeated and thus the circulation of the electrolytes is impeded and/or a short-circuit is caused between the respective cells thereby causing a short endurance to the cycle life. Further, the loss of the water head for the circulation of the electrolytes is increased making it necessary to use pumps having a greater power for circulating the electrolytes.

SUMMARY OF THE INVENTION

With a view to overcoming the foregoing deficiencies in the prior art, particularly the occurrence of abnormal electrodeposition without increasing the power of electrolyte circulating pumps, it is the primary object of the present invention to provide an improved secondary battery in which an additional electrode is provided in and/or near each of catholyte manifolds and/or channels of each secondary cell and the additional electrodes are connected to the associated cathode by means of a conductive material, thus absorbing a small current flowing into the cathode chamber of the cell by these electrodes and thereby preventing the occurrence of abnormal electrodeposition due to the entry of any shunt current and increasing the cycle life.

DESCRIPTION OF THE PREFERRED EMBODIMENTS

Figure 1:
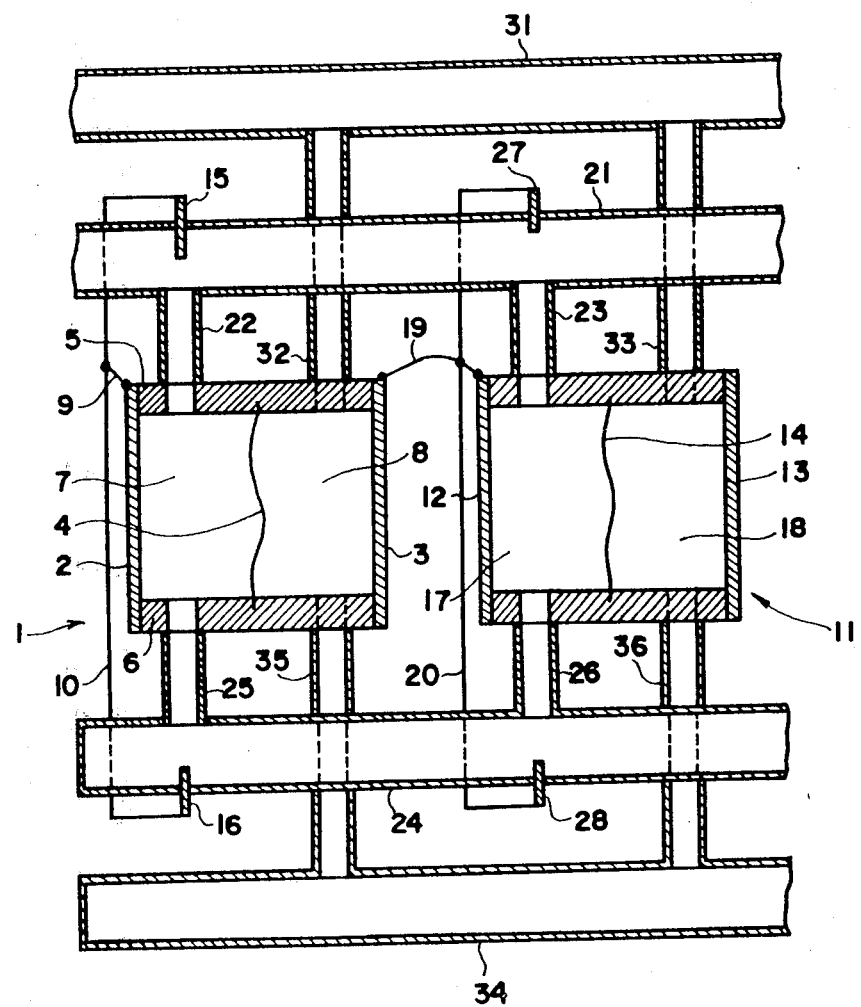
FIG. 1 is a longitudinal sectional view showing an embodiment of a secondary battery according to the invention.

Referring to FIG. 1, numerals 1 and 11 designate secondary cells, and a cell stack battery according to the invention includes for example 10 secondary cells connected in series, although the two cells 1 and 11 are shown in the Figure. Numeral 2 designates a cathode, 3 an anode, and 4 a separator positioned practically halfway between the electrodes 2 and 3. These elements are held together with bolts or the like by means of electrode frames 5 and 6. Numeral 7 designates a cathode chamber, 8 an anode chamber, and 9 a terminal of the cell 1. The anode 3 of the cell 1 is connected to a cathode 12 of the adjoining secondary cell 11 by a connector 19. Of course, in the case of a bipolar type cell stack battery it is only necessary to use one or the other of the anode and cathode 3 and 12 which are of the same potential and arrange the cells 1 and 11 in stacks.

Numeral 21 designates a catholyte inlet-side common manifold, and 22 and 23 catholyte inlet channels for connecting the cathode chambers 7 and 17 to each other. Numeral 24 designates a catholyte outlet-side common manifold, and 25 and 26 catholyte outlet channels for connecting the cathode chambers 7 and 17 to each other. Similarly, numeral 31 designates an anolyte inlet-side common manifold, 32 and 33 anolyte inlet channels, 34 an anolyte outlet-side common manifold, and 35 and 36 anolyte outlet channels. The inlet channels 22, 32, 23 and 33 and the outlet channels 25, 35, 26 and 36 are extended in a direction perpendicular to the cell stack direction of the electrode frames 5 and 6 and arranged side by side along the top and bottom electrode frames 5 and 6.

The cell stack battery constructed as described above is identical with the prior art battery and the catholyte is introduced by a pump (not shown) via the inlet-side common manifold 21 and the inlet channels 22 and 23 into the cathode chambers 7 and 17 of the cells 1 and 11 from which the electrolyte is exited into the outlet-side common manifold 24 via the outlet channels 25 and 26. On the other hand, the anolyte is introduced by a pump (not shown) via the inlet side-common manifold 31 and the inlet channels 32 and 33 into the anode chambers 8 and 18 of the cells 1 and 11 from which the electrolyte is exited into the outlet-side common manifold 34 via the outlet channels 35 and 36.

In accordance with the present invention, the cell stack battery constructed as described is further provided with electrodes 15, 16 and 27, 28 which are respectively disposed in the common electrolytes of the catholyte inlet-side and outlet-side common manifolds 21 and 24. Namely, the electrodes 15 and 16 are respectively hermetically fitted into those portions of the inlet-side common manifold 21 and the outlet-side common manifold 24 which communicate with the cathode chamber 7 of the end cell 1. Also, the electrodes 27 and 28 are respectively hermetically fitted into those portions of the inlet-side common manifold 21 and the outlet-side common manifold 24 which communicate with the cathode chamber 17 of the cell 11. Of these electrodes, the electrodes 15 and 16 are connected to the terminal 9 by a connector 10 and are thus held at the same potential as the cathode 2. Also, the electrodes 27 and 28 are connected to the connector 19 by a connector 20 and are thus held at the same potential as the cathode 12 of the cell 11.

Figure 2:
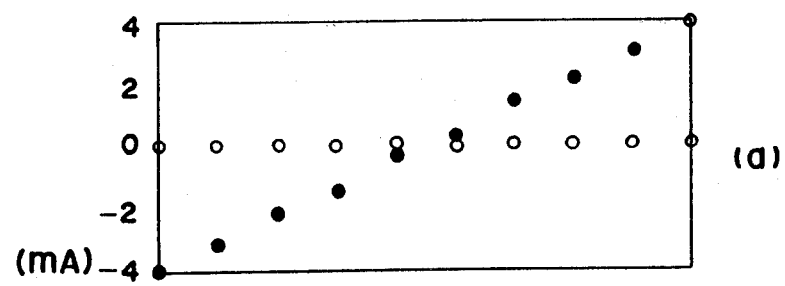
FIG. 2 shows in (a), (b), (c) and (d) characteristic diagrams comparatively showing the values of shunt current flow into the electrolyte inlet and outlet of secondary cells during the charging period with and without the application of the invention.

FIG. 2 illustrates characteristic diagrams showing the results of shunt current measurements on charge in cases (spots O) where the invention was applied to secondary batteries comprising 10 secondary cells and cases (spots ⊙) where the invention was not applied, with (a) showing the measurement results at the catholyte inlets, (b) those at the anolyte inlets, (c) those at the catholyte outlets and (d) those at the anolyte outlets. In the characteristic diagrams, the ordinates represent the shunt current value (mA) and the positive and negative values respectively represent the shunt current flowing from the cathode or anode chamber into the manifold through the channel and the shunt current flowing into the cathode or anode chamber from the manifold through the channel. The abscissas represent the channel positions of the respective cells.

These tests were conducted by measuring the shunt current values of the respective channels with a clip-on ammeter and the values were measured at the expiration of 90 to 100 minutes after starting the charge with a charging voltage of 22 V and a charging current of 12 A. As will be apparent from (a) and (c) of FIG. 2, there was the flow of small current into the cathode chambers in the cases without the application of the invention and the flow of small current into the cathode chambers was eliminated in the cases where the invention was applied.

When the tests were continued further and then the batteries were disassembled after the lapse of 25 hours through the cycles of charge and discharge to compare the electrodeposition of the zinc on the cathodes surface, the occurrence of dendritic electrodeposition of the zinc on the cathodes near the channels was seen in the cases without the application of the invention and there was no such abnormal electrodeposition in the cases where the invention was applied.

While, in the embodiment described above, the electrodes 15, 16, 27 and 28 are fitted into the inlet-side and outlet-side common manifolds 21 and 24, these electrodes 15, 16, 27 and 28 may be respectively positioned near the inlet and outlet channels which communicate with the cathode chambers of the stacked secondary cells.

Figure 3:
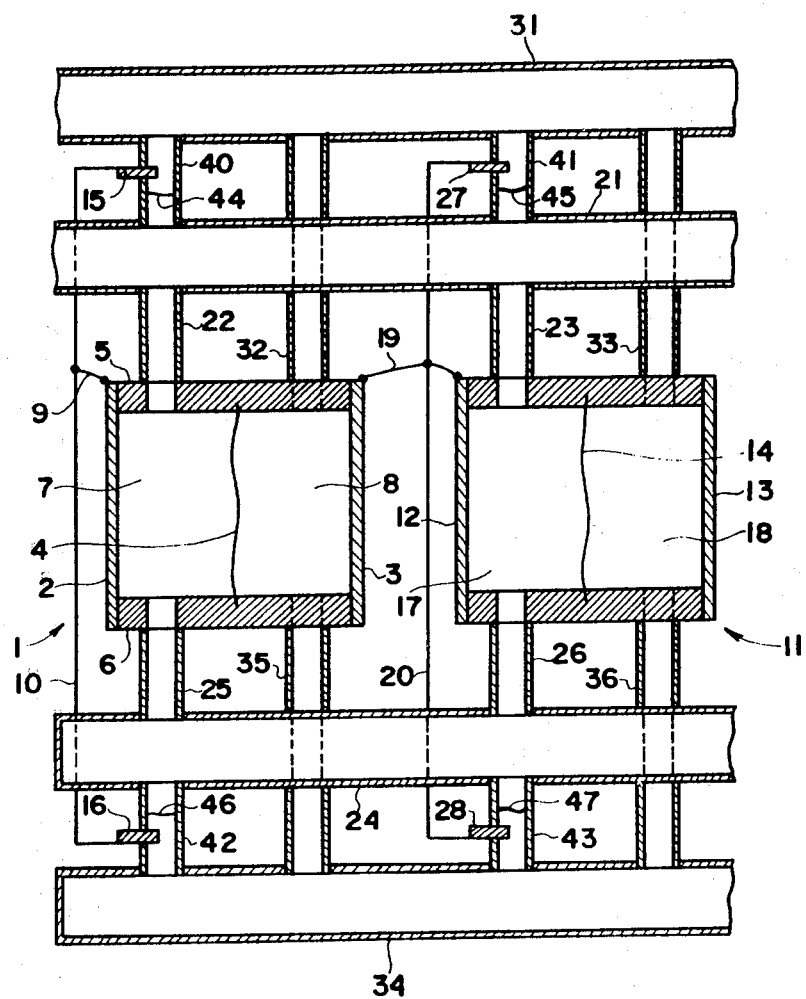
FIG. 3 is a longitudinal sectional view showing another embodiment of the invention.

FIG. 3 shows another embodiment of the invention. This embodiment differs from the cell stack secondary battery described in connection with FIG. 1 in that pipes 40, 41 and 42, 43 for connecting the catholyte inlet-side common manifold 21 to the anolyte inlet-side common manifold 31 and the catholyte outlet-side common manifold 24 to the anolyte outlet-side common manifold 34, are respectively provided at near the junction points between the catholyte inlet-side common manifold 21 and the catholyte inlet channels 22 and 23 and between the catholyte outlet-side common manifold 24 and the catholyte outlet channels 25 and 26, respectively. Further, separators 44, 45, 46 and 47 are respectively disposed in the pipes 40, 41, 42 and 43 so as to prevent mixing of the catholyte and anolyte, and the electrodes 15, 16, 27 and 28 according to the invention are respectively disposed in the anolyte in these pipes. Each of these separators transmits ions but prevents the transmission of the electrolytes. More specifically, the electrodes 15, 16, 27 and 28 are respectively hermetically fitted into the anolyte side of the newly provided pipes 40, 41, 42 and 43 which are separated by the separators 44, 45, 46 and 47, respectively. Of these electrodes, the electrodes 15 and 16 are connected to the terminal 9 by the connector 10 and held at the same potential as the cathode 2. Also, the electrodes 27 and 28 are connected to the connector 19 by the connector 20 and held at the same potential as the cathode 12. In this way, the same effect as the arrangement of FIG. 1 can be obtained with the arrangement of the electrodes 15, 16, 27 and 28 shown in FIG. 3. Still further, in contrast to the first embodiment in which the electrodes 15, 16, 27 and 28 are fitted into the catholyte inlet and outlet common manifolds, the deposition of the metal of the negatively active material on the cathodes is prevented.

From the foregoing detailed description it will be seen that in accordance with the cell stack secondary battery of this invention the occurrence of abnormal electrodeposition can be prevented and the cycle life can be increased by virtue of the fact that an electrode is provided in the vicinity of each of the inlet and outlet of a cathode chamber of each secondary battery and the potential of these electrodes is held equal to that of the associated cathode, thereby absorbing small shunt current which causes the occurrence of abnormal electrodeposition.

We claim:

1. In an electrolyte circulation type cell stack secondary battery in which the negatively active material is a metal selected from the group consisting of cadmium, zinc and lead, the improvement wherein an electrode is projected fronting on each of a cathode electrolyte inlet and outlet of each of a plurality of secondary cells, and wherein said electrodes are connected electrically to a cathode of each said secondary cell by connecting means, thereby maintaining said electrodes at the same electric potential as said cathode during the charge and preventing the occurrence of abnormal electrodeposition.

2. In an electrolyte circulating type cell stack secondary battery in which the negatively active material is a metal selected from the group consisting of cadmium, zinc and lead, the improvement wherein each of two cathode electrolyte channels of each of a plurality of secondary cells is connected to an anode electrolyte channel by way of a separator, wherein an electrode is disposed in an area on the anode electrolyte side of each said separator, and wherein said electrodes are connected electrically to a cathode of each said secondary cell and are held at the same electric potential as said cathode, thereby preventing the occurrence of abnormal electrodeposition.

* * * * *